(12) United States Patent
Lindinger et al.

(10) Patent No.: US 8,538,624 B2
(45) Date of Patent: Sep. 17, 2013

(54) METHOD AND APPARATUS FOR TRANSMITTING DATA BETWEEN A TACHOGRAPH AND A DATA PROCESSING DEVICE

(75) Inventors: Andreas Lindinger, Flözlingen (DE); Gunnar Schmidt, Villingen-Schwenningen (DE); Denis Smolin, Villingen-Schwenningen (DE)

(73) Assignee: Continental Automotive GmbH, Hannover (DE)

( * ) Notice: Subject to any disclaimer, the term of this patent is extended or adjusted under 35 U.S.C. 154(b) by 320 days.

(21) Appl. No.: 12/444,946

(22) PCT Filed: Oct. 1, 2007

(86) PCT No.: PCT/EP2007/060381
§ 371 (c)(1),
(2), (4) Date: Apr. 9, 2009

(87) PCT Pub. No.: WO2008/043678
PCT Pub. Date: Apr. 17, 2008

(65) Prior Publication Data
US 2010/0004813 A1    Jan. 7, 2010

(30) Foreign Application Priority Data

Oct. 9, 2006 (DE) .......................... 10 2006 048 029

(51) Int. Cl.
*G06F 17/40* (2006.01)

(52) U.S. Cl.
USPC .......................... 701/32.6; 701/32.5; 713/176

(58) Field of Classification Search
USPC ................ 701/33, 31.5, 32.5, 32.6; 713/168, 713/176, 181; 455/410
See application file for complete search history.

(56) References Cited

U.S. PATENT DOCUMENTS

| 5,491,473 | A | 2/1996 | Gilbert |
| 6,144,927 | A * | 11/2000 | Grill et al. ..................... 702/142 |
| 6,236,911 | B1 * | 5/2001 | Kruger .............................. 701/1 |
| 6,490,513 | B1 | 12/2002 | Fish et al. |
| 6,525,672 | B2 * | 2/2003 | Chainer et al. ................ 340/904 |
| 6,772,090 | B2 * | 8/2004 | Hutton et al. .................. 702/165 |

(Continued)

FOREIGN PATENT DOCUMENTS

| DE | 19710393 | 9/1998 |
| DE | 19738631 | 3/1999 |

(Continued)

*Primary Examiner* — Darnell Jayne
*Assistant Examiner* — Sasha T Varghese
(74) *Attorney, Agent, or Firm* — Cozen O'Connor

(57) ABSTRACT

A system and method for transmitting data via a transmission path between a tachograph arranged in a vehicle, and a data processing device which is remote from the vehicle. To improve data protection, the transmission takes place via a first path section of the transmission path, which path section is arranged between the tachograph and a communication controller arranged in the vehicle, and a second wireless path section of the transmission path, which path section is arranged between the communication controller and the data processing device. The tachograph in response to an encryption request signal sent from the data processing device to the tachograph encrypts data sent from the tachograph to the data processing device. The data is transmitted in encrypted form from the tachograph to the data processing device both via the first path section and via the second path section.

14 Claims, 2 Drawing Sheets

(56) References Cited

U.S. PATENT DOCUMENTS

| | | |
|---|---|---|
| 6,804,506 B1 | 10/2004 | Freitag et al. |
| 6,853,910 B1 * | 2/2005 | Oesterling et al. ............ 701/207 |
| 6,920,379 B2 | 7/2005 | Miyamoto |
| 2002/0167519 A1 * | 11/2002 | Olsen ........................... 345/440 |
| 2003/0009270 A1 * | 1/2003 | Breed ............................ 701/29 |
| 2003/0097335 A1 | 5/2003 | Moskowitz et al. |
| 2003/0117295 A1 * | 6/2003 | Okada ..................... 340/825.72 |
| 2003/0135304 A1 * | 7/2003 | Sroub et al. ....................... 701/1 |
| 2003/0147536 A1 * | 8/2003 | Andivahis et al. ............ 380/277 |
| 2004/0003228 A1 * | 1/2004 | Fehr et al. ..................... 713/155 |
| 2004/0019412 A1 | 1/2004 | Miyamoto |
| 2004/0083374 A1 * | 4/2004 | Sugawara ..................... 713/189 |
| 2004/0151323 A1 * | 8/2004 | Olkin et al. ................... 380/280 |
| 2008/0059701 A1 * | 3/2008 | Esfandabadi ................. 711/115 |
| 2008/0235520 A1 * | 9/2008 | Becker et al. ................. 713/189 |
| 2008/0251577 A1 * | 10/2008 | Kimmich et al. ............. 235/377 |
| 2009/0013412 A1 * | 1/2009 | Nather ............................ 726/27 |
| 2009/0327760 A1 * | 12/2009 | Lindinger et al. ............ 713/193 |
| 2010/0075633 A1 * | 3/2010 | Lydike et al. ................. 455/411 |

FOREIGN PATENT DOCUMENTS

| | | |
|---|---|---|
| DE | 198 12 215 | 9/1999 |
| DE | 10032301 | 1/2002 |
| DE | 103 15 782 | 2/2004 |
| EP | 1 286 312 | 2/2003 |
| WO | WO 03/046838 | 6/2003 |

* cited by examiner

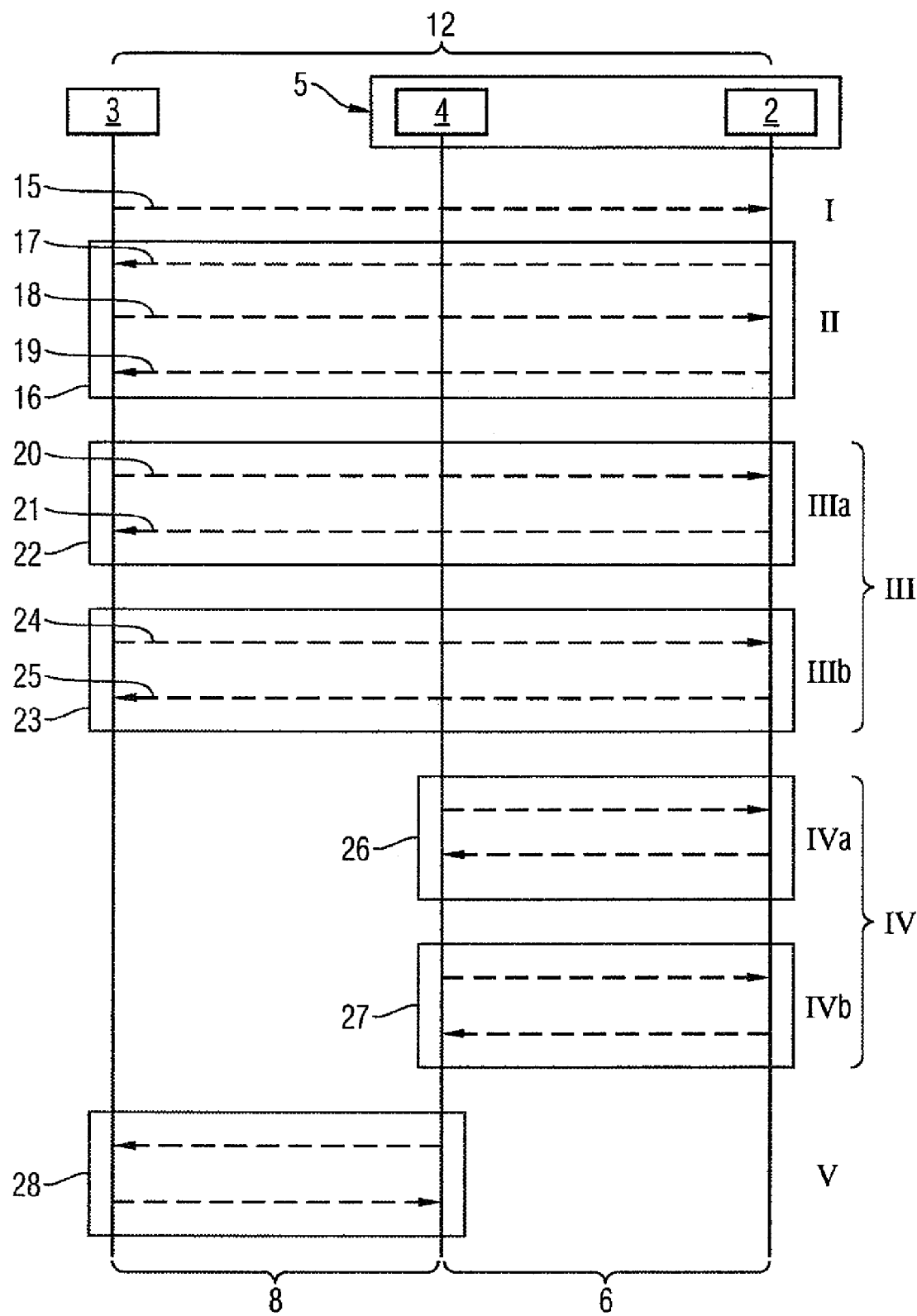

METHOD AND APPARATUS FOR TRANSMITTING DATA BETWEEN A TACHOGRAPH AND A DATA PROCESSING DEVICE

PRIORITY CLAIM

This is a U.S. national stage of application No. PCT/EP2007/060381, filed on 1 Oct. 2007. Priority is claimed on the following application: Country: Germany, Application No.: 10 2006 048 029.5, filed: 9 Oct. 2006; the content of both being incorporated herein by reference.

BACKGROUND OF THE INVENTION

1. Field of the Invention

The invention relates to a method for transmitting data via a transmission path between a tachograph arranged in a vehicle, and a data processing device remote from the vehicle. In addition, the invention relates to an apparatus for transmitting data via a transmission path between a tachograph and a data processing device.

2. Prior Art

It is known to equip a motor vehicle, particularly a utility vehicle, with a tachograph to record, among other things, driver data relating to activities of a driver of the motor vehicle. vehicle data, trip data, and to provide this data for control activities. In some countries and regions of the world, tachographs are necessarily prescribed at least for certain classes of motor vehicles or types of motor vehicles to enable authorities to check compliance with legal regulations such as compliance with prescribed driving and rest times by the driver. For evaluation purposes, the recorded data can be transmitted via a radio link to a data processing device of a haulage firm using the motor vehicle.

SUMMARY OF THE INVENTION

An object of the present invention to specify a method that offers improved data protection during the data transmission. It is also an object of the present invention to create an apparatus for carrying out such a method.

According to one embodiment of the invention, transmission takes place via a first path section of the transmission path, which path section is arranged between the tachograph and a communication controller arranged in the vehicle, and a second path section of the transmission path, which path section is arranged between the communication controller and the data processing device and preferably comprises an air link, the tachograph encrypting, based on an encryption request signal sent by the data processing device to the tachograph, data to be sent by the tachograph to the data processing device and wherein data is transmitted encrypted by the tachograph to the data processing device both via the first path section and via the second path section.

It is of particular advantage in the method according to one embodiment of the invention that the data, when an encryption request signal is present, is transmitted not only encrypted, and thus illegible to unauthorized third parties, between communication controller and data processing device but also encrypted between tachograph and communication controller. The encryption thus covers the data transmission over the entire transmission path. The data is thus protected against tappings directly at the vehicle as could be carried out, for example, at freeway parking areas. It is also advantageous that encryption only takes place when the data processing device requests encrypted data; this makes it possible to increase the transmission rate when only generally accessible data which is not sensitive is transmitted. Encryption preferably takes place in both directions of transmission, that is to say both from the tachograph to the data processing device and from the data processing device to the tachograph. It is of great advantage in the invention that the encryption (before data is sent to the data processing device) and, if necessary, also the decryption (after data is received from the data processing device) is effected by the tachograph as a result of which, the data transmission paths are kept especially short and secure and, encryption and decryption functionalities already provided regularly by the tachograph is utilized. With a simple process flow, the invention advantageously offers high security against unwanted data tapping by unauthorized third parties during the data transmission. An encryption is particularly important and advantageous if the data to be transmitted are person-related data such as, for example, driving and rest times of a driver of the vehicle or company-internal data, not intended for third parties, with respect to a motor pool of a haulage firm.

In one embodiment of the invention, encryption of the data sent by the tachograph to the data processing device is requested automatically, particularly under program control, by the data processing device based on the type of data requested. In contrast, for a particularly secure and efficient data transmission according to a development of the invention, the encryption request signal is sent to the tachograph when a selection means of the data processing device is operated. The selection means can be a particular operating key of the data processing device or a program of the data processing device which is started by the operation, and is operated by an operator.

According to another embodiment of the invention, the tachograph provides the data, to be sent by the tachograph to the data processing device, with one of at least a signature and with a check sum and the data is transmitted together with the signature or together with the check sum by the tachograph to the data processing device both via the first path section and via the second path section. With the aid of the signature or check sum, it is possible to recognize manipulations, which, could be performed on encrypted data. In the case of a manipulation or a suspicion of a manipulation, a new data transmission is performed. The signature, which is preferably at least one of a digital signature, or the check sum protect(s) the integrity of the data.

A manipulation protection, for example at least one of a signature and/or a check sum transmitted together with the data, is provided for the transmitted data with each data transmission. In contrast, according to another embodiment of the invention, the data processing device sends to the tachograph a protection request signal for providing the data, to be sent by the tachograph to the data processing device, with a signature and/or with a check sum. The protection request signal is sent at least one of under program control and regularly with each data request by the data processing device, and that the protection request signal is sent to the tachograph when a selection means of the data processing device is operated.

According to another embodiment of the invention, the data to be sent by the tachograph to the data processing device is transmitted, in a first transmission step, by the tachograph to the communication controller and, in a second transmission step, by the communication controller to the data processing device. In this way, the transmission security can be increased significantly particularly with a large amount of data to be transmitted; this is because the data can first be collected and assembled by the communication controller before being transmitted in a bundled format to the data processing device. The data processing device does thus not need to be connected to the communication controller for a long time but a comparatively short time interval is sufficient for the data connection via the second path section, which also minimizes a risk of interruption of the data transmission.

In this context, it is of particular advantage for further increased data and transmission security if, according to a development of the invention, the second transmission step does not begin before the first transmission step is concluded, so that a concluding data transmission to the data processing device only takes place when the data are present completely in the communication controller.

According to one embodiment the invention, the tachograph and a communication controller are arranged in a vehicle and the data processing device is remote from the vehicle, wherein a first path section of the transmission path is arranged between the tachograph and the communication controller and a second path section of the transmission path is arranged between the communication controller and the data processing device, the second path section comprising an air link, and the tachograph having an encryption device for encrypting data to be sent by the tachograph to the data processing device via the transmission path.

It is particularly advantageous that by means of the invention, an encryption device of the trip recorder, which can generally also be called a tachograph and which, in particular, is an electronic so called digital tachograph (DTCO), can be used for an encrypted data transmission, which encryption device, for example, can also be used for an encrypted storage of data on a data card. As a result, the apparatus according to the invention can have a simple structure and have very high operating reliability. The data processing device which, for example, can have a work station computer (PC), is preferably arranged to be stationary, for example in an administration of a haulage firm using the motor vehicle which, in particular, can be a utility vehicle, for example a truck, and is used for evaluating data obtained by means of the tachograph, particularly vehicle and/or driver and/or trip data. Due to the separation of tachograph and communication controller provided in the apparatus according to the invention—wherein, however, both devices can also be accommodated in a single housing—an improved data handling is made possible in the vehicle, particularly in the case of large volumes of data, and transmission errors and/or transmission interruptions during a data transmission to the or from the data processing device, which could occur when the vehicle is moving, for example when traveling through tunnels, are largely eliminated.

It is of special advantage, particularly for high security against unwanted changes of data transmitted between tachograph and data processing device if, according to a development of the invention, the tachograph has a protection device for providing the data, to be sent by the tachograph to the data processing device via the transmission path, with at least one of a signature and a check sum.

According to another advantageous development of the invention, the data processing device has a selection means for sending an encryption request signal to the tachograph for encrypting the data to be sent by the tachograph to the data processing device via the transmission path. For example, this opens up the possibility for an operator of the data processing device to selectively initiate an encryption for an impending data transmission to be carried out.

According to another advantageous development of the invention, an operator, in particular, can selectively initiate an increase in the protection against manipulation of transmitted data if the data processing device has a selection means for sending a protection request signal to the tachograph for providing the data, to be sent by the tachograph to the data processing device via the transmission path, with a signature and/or with a check sum.

BRIEF DESCRIPTION OF THE DRAWINGS

An exemplary embodiment of the invention is shown diagrammatically in the drawing and will be described in greater detail in the text which follows, in which FIG. 1 is a simplified structure of an apparatus for transmitting data between a tachograph and a data processing device and FIG. 2 is a flow diagram of a method for transmitting data between the tachograph and the data processing device according to FIG. 1.

DETAILED DESCRIPTION OF THE DRAWINGS

Figure 1:
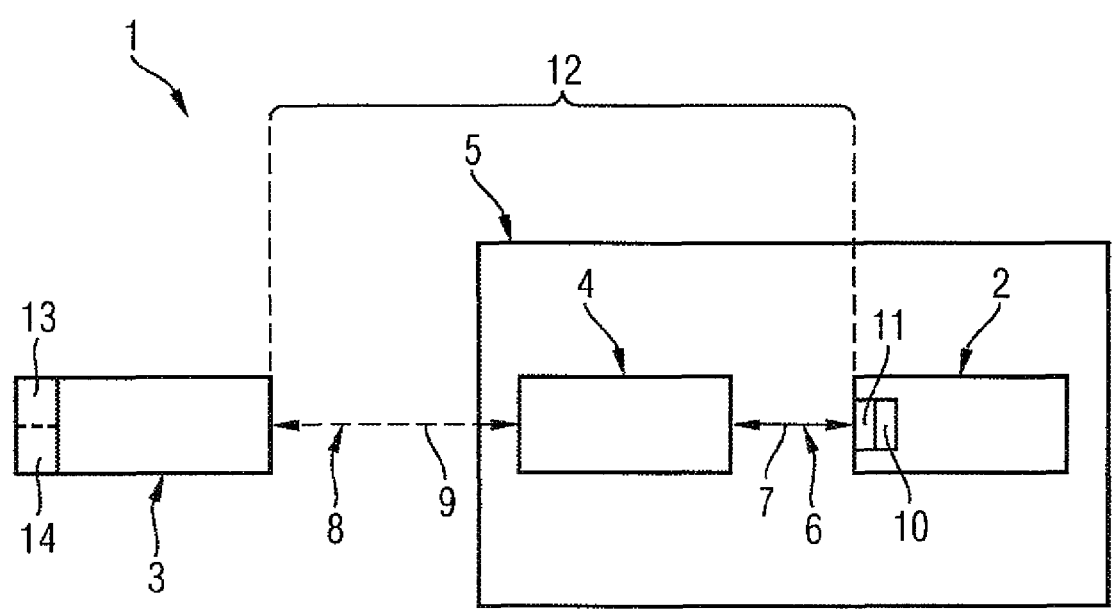

Elements corresponding to one another in each case are provided with identical reference symbols in both figures. FIG. 1 shows simplified an apparatus 1 for transmitting data via a transmission path 12 between a tachograph 2 constructed as a digital tachograph (DTCO) and a data processing device 3 having a work station computer (PC). In this arrangement, the tachograph 2 and a communication controller 4 are arranged in a vehicle 5, constructed as motor vehicle in the present case, which, in the present exemplary embodiment, is a utility vehicle, particularly a truck. The data processing device 3 is arranged remote from the vehicle 5 and is located, for example, in an administration of a haulage firm using the motor vehicle.

It can be seen that a first path section 6, symbolized by a double arrow 7 with continuous line, of the transmission path 12 is located between the tachograph 2 and the communication controller 4 and that a second path section 8, symbolized by a double arrow 9 with dashed line, of the transmission path 12 is located between the communication controller 4 and the data processing device 3. The transmission path 12 thus comprises at least the first path section 6, the communication controller 4 and the second path section 8.

The double arrows 7, 9 indicate that data transmission can take place in both directions, that is to say both from the tachograph 2 to the data processing device 3 and from the data processing device 3 to the tachograph 2. The aforementioned second path section 8 indicated by the dashing of the line of the associated double arrow 9 is typically an air link via which the data is transmitted, for example, by radio.

The tachograph 2 has an encryption device 10 for encrypting data to be sent by the tachograph 2 to the data processing device 3 via the transmission path 12 and, in the present exemplary embodiment, a protection device 11 for providing the data, to be sent by the tachograph 2 to the data processing device 3 via the transmission path, with at least one of a signature, a check sum, or the like.

The data processing device 3 has a first selection portion 13 for sending an encryption request signal to the tachograph 2 for an encryption of the data to be sent by the tachograph 2 to the data processing device 3 via the transmission path 12, and a second selection portion 14 for sending a protection request signal to the tachograph 2 for providing the data, to be sent by the tachograph 2 to the data processing device 3 via the transmission path 12, with at least one of a signature, a check sum or the like. The first selection portion 13 and the second selection means 14 can also be integrated, for example, in a single module such as an operating key.

FIG. 2 shows an exemplary flow diagram for transmitting data via the transmission path 12 between the tachograph 2 and the data processing device 3 of the apparatus 1 according to FIG. 1, the tachograph 2 and the communication controller 4 being arranged in the vehicle 5 and the data processing device 3 being arranged in a remote location such as a building of the haulage firm administration.

In a first step I, the data processing device 3 sends an authentication request, symbolized by an arrow 15, to the tachograph 2. By this authentication request, the data processing device identifies itself to the tachograph 2. An authentication is performed in a second step II, combined by a frame 16, wherein successively oppositely directed arrows 17, 18 signify an authentication process and an arrow 19 pointing from the tachograph 2 to the data processing device 3 signifies an acknowledgement of the authentication as successful. In general, the term authentication is used in the present exemplary embodiment both for a process of proving one's own identity and, in the sense of an authentication, for a process of checking an identity of an opposite party.

For a subsequent third step III, two embodiments IIIa, IIIb are shown. According to the first embodiment IIIa, combined in a first frame 22 of the third step III, the data processing device 3 sends to the tachograph 2 an enquiry, symbolized by an arrow 20, with a protection request signal for providing the data, to be sent by the tachograph 2 to the data processing device 3, with a signature. In the opposite direction, represented by a further arrow 21, a confirmation of an acceptance of the enquiry by the tachograph 2 is then rendered.

According to the second embodiment IIIb, combined in a second frame 23, of the third step III, the data processing device 3 sends to the tachograph 2 an enquiry, symbolized by an arrow 24, a protection request signal and an encryption request signal for additional encryption of the data to be sent by the tachograph 2 to the data processing device 3. In the opposite direction, represented by a further arrow 25, a confirmation of an acceptance of the enquiry by the tachograph 2 is sent to processing data 3.

Corresponding to embodiments IIIa, IIIb of the third step III, the subsequent fourth step IV of the method also has two embodiments IVa, IVb. According to the first embodiment IVa, framed by a first frame 26, of the fourth step IV, which corresponds to the first embodiment IIIa of the third step III. The data requested at the tachograph 2 by the data processing device 3 is downloaded signed into the communication controller 4 from the tachograph 2, that is to say transmitted via the first path section 6 of the transmission path 12.

In the case of the second embodiment IVb, framed by a further frame 27, of the fourth step IV corresponds to the second variant IIIb of the third step III, the data requested at the tachograph 2 by the data processing device 3 is downloaded signed and encrypted into the communication controller 4 from the tachograph 2, that is to say transmitted via the first path section 6 of the transmission path 12.

At the end of the fourth step IV, the requested data is contained either only signed (according to the first variant IVa) or signed and encrypted (according to the second variant IVb) completely in the communication controller 4. In a concluding fifth step V illustrated by means of a frame 28, these data are forwarded completely to the data processing device 3 and during this process transmitted via the second path section 8 of the transmission path 12. It should be noted that in one embodiment, the data transmission from communication controller 4 to processing device 3 is comprised.

Thus, while there have shown and described and pointed out fundamental novel features of the invention as applied to a preferred embodiment thereof it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for transmitting data via a transmission path between a tachograph arranged in a vehicle and a data processing device remote from the vehicle, comprising:
   receiving by the tachograph an enquiry sent by the data processing device;
   encrypting by the tachograph, only when the enquiry includes an encryption request, data to be sent by the tachograph to the data processing device, the encrypting being based at least in part on the encryption request;
   transmitting only the encrypted data by the tachograph to the data processing device via a first path section arranged between the tachograph and a communication controller arranged in the vehicle and via a second path section arranged between the communication controller and the data processing device and comprising an air link when the enquiry includes the encryption request,
   whereby the step of encrypting is performed only when the enquiry includes the encryption request, allowing an increased transmission rate when the encryption request is not present.

2. The method according to claim 1, wherein the encryption request is sent to the tachograph when a selection portion of the data processing device is operated.

3. The method according to claim 2, wherein the selection portion is an operating key on the data processing device.

4. The method according to claim 1, further comprising:
   providing the data to be sent by the tachograph to the data processing device with at least one of a signature and a check sum,
   wherein the step of transmitting comprises transmitting the encrypted data with the at least one of the signature and the check sum by the tachograph to the data processing device via the first path section and the second path section.

5. The method according to claim 1, further comprising:
   receiving by the tachograph a protection request signal sent by the data processing device indicating that the encrypted data is to be sent by the tachograph with at least one of a signature and a check sum.

6. The method according to claim 1, wherein the step of transmitting comprises transmitting the encrypted data by the tachograph in a first transmission step to the communication controller and, transmitting the encrypted data in a second transmission step, by the communication controller to the data processing device.

7. The method according to claim 6, wherein the second transmission step begins after the first transmission step is concluded.

8. The method according to claim 1, wherein the transmitting is at a first rate when the enquiry includes the encryption request and the transmitting is at a second rate when the encryption request is not present,
   wherein the second rate is faster than the first rate.

9. An apparatus for transmitting data via a transmission path between a tachograph and a data processing device, the apparatus comprising:
- the tachograph arranged in a vehicle;
- a communication controller arranged in the vehicle and coupled to the tachograph;
- the data processing device arranged remote from the vehicle; and
- the tachograph including an encryption device configured to encrypt the data in response to an enquiry,
- wherein a first path section of the transmission path is arranged between the tachograph and the communication controller and a second path section of the transmission path comprising a wireless link is arranged between the communication controller and the data processing device,
- wherein the tachograph is configured to transmit only the encrypted data to the data processing device via the first path section and via the second path section only when the enquiry includes an encryption request, whereby the encrypting is performed only when the enquiry includes the encryption request, allowing an increased transmission rate when the encryption request is not present.

10. The apparatus according to claim 9, wherein the tachograph further comprises a protection device configured to provide the data sent by the tachograph via the transmission path with at least one of a signature and a check sum.

11. The apparatus according to claim 10, wherein the data processing device further comprises a first selection portion configured to send the encryption request signal to the tachograph, the encryption request configured to cause the tachograph to encrypt the data sent by the tachograph to the data processing device via the transmission path.

12. The apparatus according to claim 11, wherein the data processing device further comprises a second selection portion configured to send a protection request signal to the tachograph indicating that the data, sent by the tachograph to the data processing device via the transmission path is to be provided with the at least one of a signature and a check sum.

13. The apparatus according to claim 12, wherein the first and second selection portions each comprise at least one operating key.

14. The apparatus according to claim 9, wherein the data processing device further comprises a second selection portion configured to send a protection request signal to the tachograph indicating that the data, sent by the tachograph to the data processing device via the transmission path is to be provided with the at least one of a signature and a check sum.

* * * * *